United States Patent
Kim et al.

(10) Patent No.: US 9,207,785 B2
(45) Date of Patent: Dec. 8, 2015

(54) VOLTAGE GENERATOR AND ORGANIC LIGHT EMITTING DISPLAY DEVICE USING THE SAME

(71) Applicants: Su-Weon Kim, Yongin (KR); Hak-Ki Choi, Yongin (KR)

(72) Inventors: Su-Weon Kim, Yongin (KR); Hak-Ki Choi, Yongin (KR)

(73) Assignee: SAMSUNG DISPLAY CO., LTD., Yongin, Gyunggi-Do (KR)

( * ) Notice: Subject to any disclaimer, the term of this patent is extended or adjusted under 35 U.S.C. 154(b) by 340 days.

(21) Appl. No.: 13/670,923

(22) Filed: Nov. 7, 2012

(65) Prior Publication Data

US 2014/0022227 A1    Jan. 23, 2014

(30) Foreign Application Priority Data

Jul. 17, 2012  (KR) ........................ 10-2012-0077788

(51) Int. Cl.
*G06F 3/038* (2013.01)
(52) U.S. Cl.
CPC ...................................... *G06F 3/038* (2013.01)
(58) Field of Classification Search
CPC .... G06F 3/038; G05F 1/46; G05F 1/66–1/67; G05F 1/70
USPC .............. 345/211, 212, 76, 83; 323/282, 232; 315/160–176
See application file for complete search history.

(56) References Cited

U.S. PATENT DOCUMENTS

| | | | |
|---|---|---|---|
| 4,672,230 A * | 6/1987 | Spahn | 307/116 |
| 2008/0225061 A1 * | 9/2008 | Kimura et al. | 345/690 |
| 2008/0246702 A1 * | 10/2008 | Lee et al. | 345/77 |
| 2009/0009104 A1 * | 1/2009 | Doi et al. | 315/291 |
| 2009/0146635 A1 | 6/2009 | Qiu et al. | |
| 2010/0091006 A1 * | 4/2010 | Yoo et al. | 345/213 |
| 2011/0025586 A1 * | 2/2011 | Lee | 345/76 |
| 2011/0025671 A1 * | 2/2011 | Lee | 345/211 |
| 2011/0115777 A1 * | 5/2011 | Park | 345/212 |
| 2012/0032658 A1 * | 2/2012 | Casey et al. | 323/271 |

FOREIGN PATENT DOCUMENTS

| | | |
|---|---|---|
| KP | 10-2011-0093493 A | 8/2011 |
| KR | 10-2004-0066292 A | 7/2004 |
| KR | 10-2010-0089820 A | 8/2010 |

* cited by examiner

*Primary Examiner* — Kathy Wang-Hurst
*Assistant Examiner* — Matthew Yeung
(74) *Attorney, Agent, or Firm* — Lee & Morse, P.C.

(57) ABSTRACT

A voltage generator includes a DC/DC converter configured to output a first voltage during a first period of a frame period, the DC/DC converter being connected to a first power voltage and to a second power voltage lower than the first power voltage, a first transistor coupled between the DC/DC converter and an output terminal, the first transistor being configured to be turned on during the first period, a second transistor coupled between the output terminal and a third voltage source, the third voltage source being configured to supply a third voltage lower than the first voltage, and the second transistor being configured to be turned on during a third period of the frame period, and a voltage controller coupled to the output terminal, the voltage controller being configured to limit a voltage of the output terminal.

21 Claims, 7 Drawing Sheets

VOLTAGE GENERATOR AND ORGANIC LIGHT EMITTING DISPLAY DEVICE USING THE SAME

CROSS-REFERENCE TO RELATED APPLICATION

Korean Patent Application No. 10-2012-0077788, filed on Jul. 17, 2012, in the Korean Intellectual Property Office, and entitled: "Voltage Generator and Organic Light Emitting Display Device Using the same" is incorporated by reference herein in its entirety.

BACKGROUND

1. Field

An aspect of example embodiments relates to a voltage generator and an organic light emitting display device using the same, and more particularly, to a voltage generator and an organic light emitting display device using the same, which can improve stability.

2. Description of the Related Art

Recently, there have been developed various types of flat panel display devices capable of reducing the weight and volume of cathode ray tubes, which are disadvantages. The flat panel display devices include a liquid crystal display, a field emission display, a plasma display panel, an organic light emitting display device, and the like.

Among these flat panel display devices, the organic light emitting display displays images using organic light emitting diodes that emit light through recombination of electrons and holes. The organic light emitting display has a fast response speed and is driven with low power consumption.

Generally, organic light emitting displays are classified into a passive matrix organic light emitting display (PMOLED) and an active matrix organic light emitting display (AMOLED), depending on a method of driving organic light emitting diodes. For example, the AMOLED includes a plurality of scan lines, a plurality of data lines, a plurality of power lines, and a plurality of pixels connected to these lines and arranged in a matrix form. Each of the pixels generally includes an organic light emitting diode, a driving transistor for controlling the amount of current supplied to the organic light emitting diode, a switching transistor for transmitting a data signal to the driving transistor, and a storage capacitor for maintaining the voltage of the data signal.

The organic light emitting display device has low power consumption. However, in the organic light emitting display device, the intensity of current flowing through the organic light emitting diode is changed depending on a voltage between gate and source electrodes of the driving transistor for driving the organic light emitting diode, i.e., a variation in the threshold voltage of the driving transistor, and therefore, intensity of light emitted by the pixels may be non-uniform.

SUMMARY

Embodiments provide a voltage generator and an organic light emitting display device using the same, which can charge a desired voltage in pixels and reduce electromagnetic interference (EMI) and stresses of transistors by preventing a driving voltage from being increased and/or decreased to an undesired voltage.

Embodiments also provide a voltage generator and an organic light emitting display device using the same, which can improve display quality and decrease power consumption.

According to an aspect of the example embodiments, there is provided a voltage generator, including a DC/DC converter that outputs a first voltage during a first period of a frame period, using first power voltage and a second power voltage lower than the first power voltage, a first transistor coupled between the DC/DC converter and an output terminal so as to be turned on during the first period, a second transistor coupled between the output terminal and a third voltage source that supplies a third voltage lower than the first voltage so as to be turned on during a third period of the frame period, and a voltage controller coupled to the output terminal so as to limit the voltage of the output terminal.

The voltage controller may supply a second voltage lower than the first voltage to the output terminal during a second period between the first and third periods of the frame period and a fourth period posterior to the third period of the frame period. The second voltage may be a voltage higher than the third voltage. The DC/DC converter may include fourth and fifth transistors coupled in series between the first and second power voltages, an inductor coupled between the first transistor and a common node between the fourth and fifth transistors, and a controller that controls turn-on and turn-off of the fourth and fifth transistors.

The controller may alternately turn on and turn off the fourth and fifth transistors during the first period, and may set the fourth and fifth transistors to be respectively in turn-off and turn-on states during the second to fourth periods except the first period. The voltage controller may be coupled between the output terminal and a second voltage source that supplies a low-level voltage during the first period and supplies a high-level voltage during the second to fourth periods. The voltage controller may have a zener diode and a third transistor, coupled in series between the output terminal and the second voltage source.

The third transistor may be turned on during the second period, the fourth period and an initial period that is a portion of the first period. The voltage controller. The voltage controller may be coupled between the first power voltage and the output terminal. The voltage controller may have a zener diode and a third transistor, coupled in series between the first power voltage and the output terminal. The third transistor may be turned on during the second and fourth periods.

According to an aspect of the example embodiments, there is provided an organic light emitting display device, including pixels coupled between scan lines and data lines, a second voltage generator that supplies a low-level second voltage to the pixels during a first period that is an emission period of a frame period and supplies a high-level second voltage to the pixels during a portion of a non-emission period, and a first voltage generator that supplies a first voltage to the pixels during the first period and supplies a voltage lower than the first voltage to the pixels during the non-emission period, wherein the first voltage generator drops a voltage in the form of a step wave during the non-emission period.

The first voltage generator may have a DC/DC converter that outputs the first voltage during the first period, using a first power voltage and a second power voltage lower than the first power voltage.

BRIEF DESCRIPTION OF THE DRAWINGS

The accompanying drawings, together with the specification, illustrate exemplary embodiments, and, together with the description, serve to explain the principles of the example embodiments.

DETAILED DESCRIPTION

Hereinafter, certain exemplary embodiments will be described with reference to the accompanying drawings. Here, when a first element is described as being "coupled" to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

Figure 1:
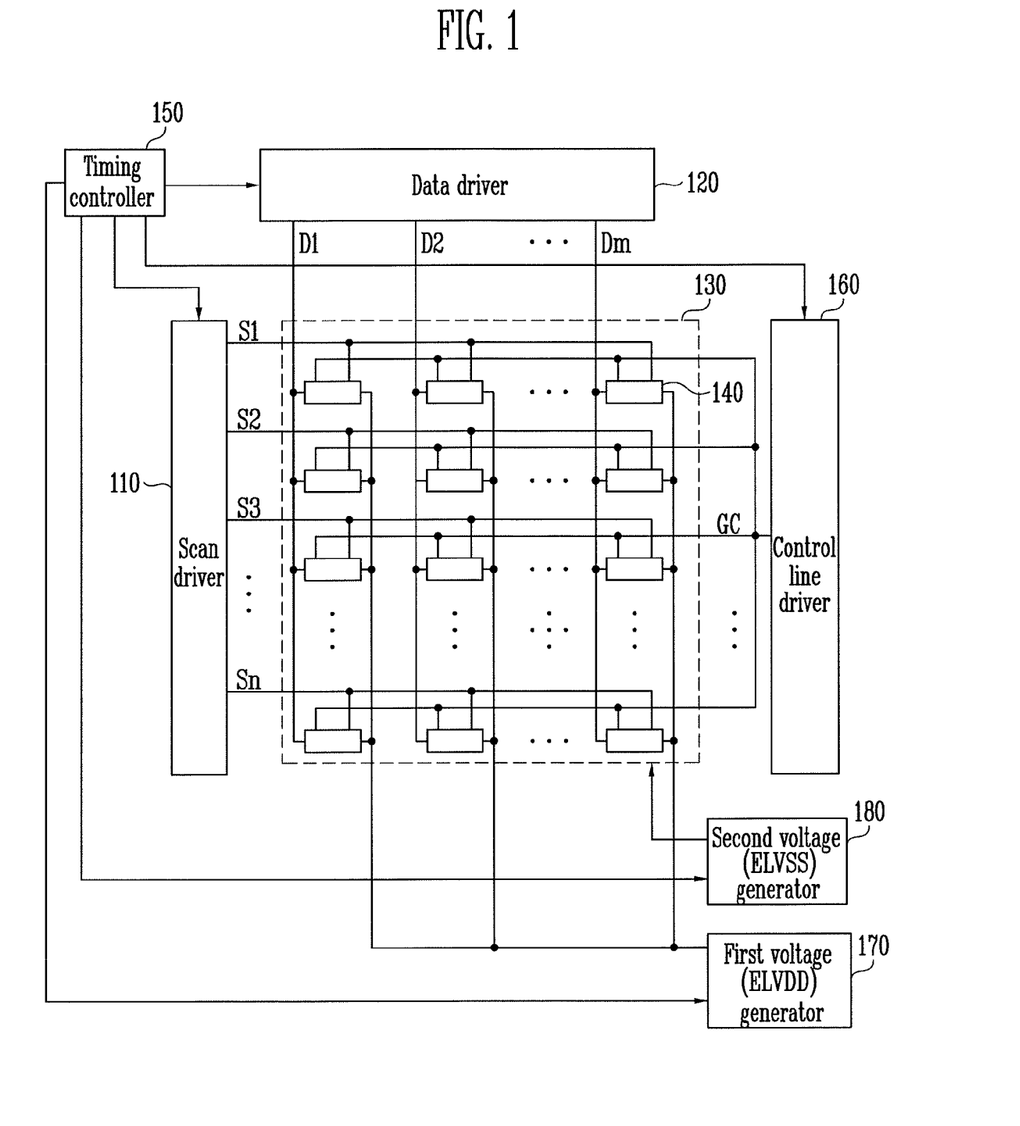
FIG. 1 is a diagram of an organic light emitting display device according to an embodiment.

FIG. 1 is a diagram of an organic light emitting display device according to an embodiment. Referring to FIG. 1, the organic light emitting display device according to this embodiment includes a pixel unit 130 having pixels 140 positioned at intersection portions of scan lines S1 to Sn, control lines GC, and data lines D1 to Dm, a scan driver 110 for driving the scan lines S1 to Sn, a control line driver 160 for driving the control lines GC, a data driver 120 for driving the data lines D1 to Dm, and a timing controller 150 for controlling the scan driver 110, the data driver 120, and the control line driver 160.

The organic light emitting display device according to this embodiment further includes a first voltage generator 170 for supplying a first voltage ELVDD to the pixels 140, and a second voltage generator 180 for supplying a second voltage ELVSS to the pixels 140.

The scan driver 110 simultaneously and/or progressively supplies a scan signal to the scan lines S1 to Sn. For example, the scan driver 110 simultaneously supplies the scan signal to the scan lines S1 to Sn during a threshold voltage compensation period in one frame period, and progressively supplies the scan signal to the scan lines S1 to Sn during a scan period in the one frame period.

The data driver 120 supplies a data signal to the data lines D1 to Dm in synchronization with the scan signal during the scan period.

The control line driver 160 supplies a control signal to the control line GC during the threshold voltage compensation period. Meanwhile, the scan signal, the control signal or the like is set to a voltage at which a transistor included in each pixel 140 can be turned on.

The pixel unit 130 has the pixels 140 positioned at intersection portions of the scan lines S1 to Sn and the data lines D1 to Dm. The pixels 140 receive the first and second voltages ELVDD and ELVSS respectively supplied from the first and second voltage generators 170 and 180. The pixel 140 controls the amount of current supplied from the first voltage ELVDD and the second voltage ELVSS via an organic light emitting diode, corresponding to the data signal during an emission period in the one frame period. Then, light having a predetermined luminance is generated from the organic light emitting diode.

The first voltage generator 170 supplies the first voltage ELVDD to the pixels 140. Here, the first voltage generator 170 supplies the first voltage ELVDD having a plurality of voltage levels during the one frame period. The detailed configuration and operation of the first voltage generator 170 will be described later.

The second voltage generator 180 supplies the second voltage ELVSS to the pixels. Here, the second voltage generator 180 supplies a low-level second voltage ELVSS during the emission period and supplies a high-level second voltage ELVSS during the other periods.

Figure 2:
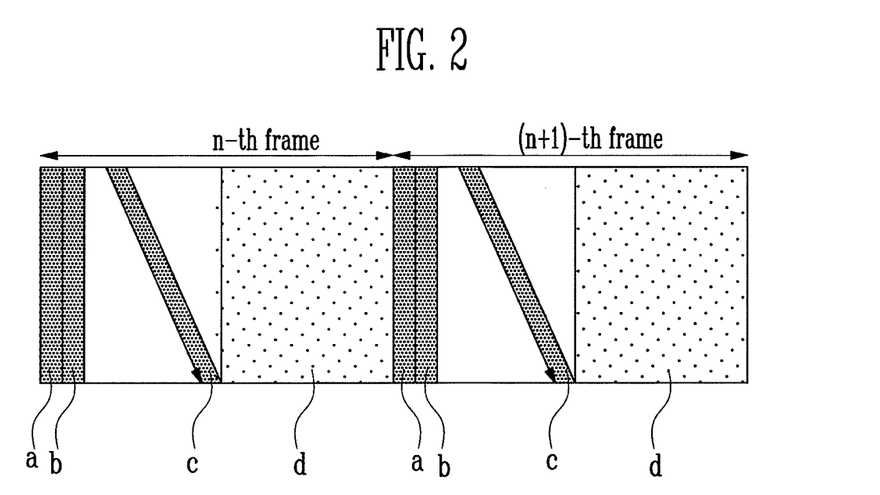
FIG. 2 is a diagram illustrating a driving method of the organic light emitting display device according to an embodiment.

FIG. 2 is a diagram illustrating a driving method of the organic light emitting display device according to an embodiment. Referring to FIG. 2, the organic light emitting display device according to this embodiment is driven using a simultaneous emission method. Generally, driving methods are divided into a progressive emission method and a simultaneous emission method. The progressive emission method refers to a method in which data is progressively, e.g., consecutively, input for each scan line, and pixels for each of the scan lines progressively emit light in the same order in which the data is input.

The simultaneous emission method refers to a method in which data is progressively input for each scan line, and the pixels simultaneously emit light after the data is input to all the pixels. One frame of the example embodiments, driven using the simultaneous emission method, is divided into a reset period 'a,' a threshold voltage compensation period 'b,' a scan period 'c', and an emission period 'd.' Here, pixels 140 for each scan line are progressively driven during the scan period 'c,' and all the pixels 140 are simultaneously driven during the reset period 'a,' the threshold voltage compensation period 'b', and the emission period 'd', except the scan period 'c.'

The reset period 'a' is a period in which the voltage of a gate electrode of a driving transistor included in each pixel 140 is initialized. In other words, the gate electrode of the driving transistor is initialized to a low voltage during the reset period.

The threshold voltage compensation period 'b' is a period in which the threshold voltage of the driving transistor is compensated. A voltage corresponding to the threshold voltage of the driving transistor is charged in each pixel 140 during the threshold voltage compensation period.

The scan period 'c' is a period in which a data signal is supplied to each pixel 140. A voltage corresponding to the data signal is charged in each pixel 140 during the scan period.

The emission period 'd' is a period in which the pixels 140 emit light, corresponding to the data signal supplied during the scan period.

In the driving method of the example embodiments, the operation periods 'a' to 'd' are temporally clearly divided, and hence it is possible to decrease the number of transistors of a compensation circuit provided to each pixel 140 and the number of signal lines for controlling the transistors. Further, since the operation periods 'a' to 'd' are temporally clearly divided, a shutter glass type 3D display can be easily implemented.

Figure 3:
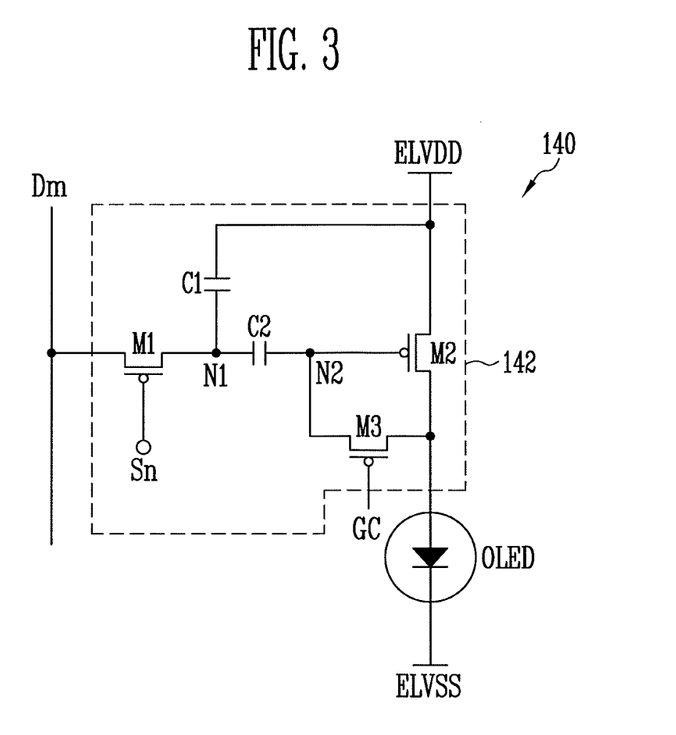
FIG. 3 is a circuit diagram showing an embodiment of a pixel shown in FIG. 1.

FIG. 3 is a circuit diagram showing an embodiment of the pixel shown in FIG. 1. For convenience of illustration, a pixel coupled to an n-th scan line Sn and an m-th data line Dm is illustrated in FIG. 3. Referring to FIG. 3, the pixel 140 according to this embodiment includes an organic light emitting diode OLED and a pixel circuit 142 that controls the amount of current supplied to the organic light emitting diode OLED.

An anode electrode of the organic light emitting diode OLED is coupled to the pixel circuit 142, and a cathode electrode of the organic light emitting diode OLED is coupled to the second voltage ELVSS. The organic light emitting diode OLED generates light having a predetermined luminance, corresponding to the current supplied from the pixel circuit 142.

The pixel circuit 142 charges a data signal and a voltage corresponding to the threshold voltage of a driving transistor, and controls the amount of the current supplied to the organic light emitting diode OLED, corresponding to the charged voltage. To this end, the pixel circuit 142 includes three transistors M1 to M3 and two capacitors C1 and C2.

A gate electrode of the first transistor M1 is coupled to the scan line Sn, and a first electrode of the first transistor M1 is coupled to the data line Dm. A second electrode of the first transistor M1 is coupled to a first node N1. When a scan signal is supplied to the scan line Sn, the first transistor M1 is turned on to electrically connect the data line and the first node N1 to each other.

A gate electrode of the second transistor (driving transistor) M2 is coupled to a second node N2, and a first electrode of the second transistor M2 is coupled to the first voltage ELVDD. A second electrode of the second transistor M2 is coupled to the anode electrode of the organic light emitting diode OLED. The second transistor M2 controls the amount of the current supplied to the organic light emitting diode OLED, corresponding to the voltage applied to the second node N2.

A first electrode of the third transistor M3 is coupled to the second electrode of the second transistor M2, and a second electrode of the third transistor M3 is coupled to the second node N2. A gate electrode of the third transistor M3 is coupled to the control line GC. When a control signal is supplied to the control line GC, the third transistor M3 is turned on to diode-connect the second transistor M2.

The first capacitor C1 is coupled between the first node N1 and the first voltage ELVDD. The first capacitor C1 charges a voltage corresponding to the data signal.

The second capacitor C2 is coupled between the first and second nodes N1 and N2. The second capacitor charges a voltage corresponding to the threshold voltage of the second transistor M2.

The pixel 140 displays a predetermined image while passing through the reset period, the threshold voltage compensation period, the scan period and the emission period, described above. Here, the pixel 140 is set to be in a non-emission state during the reset period, the threshold voltage compensation period and the scan period except the emission period. The pixel 140 may be variously driven, corresponding to the scan signal supplied to the scan lines S1 to Sn, the control signal supplied to the control line GC and the voltage levels of the first and second voltages ELVDD and ELVSS.

Figure 4:
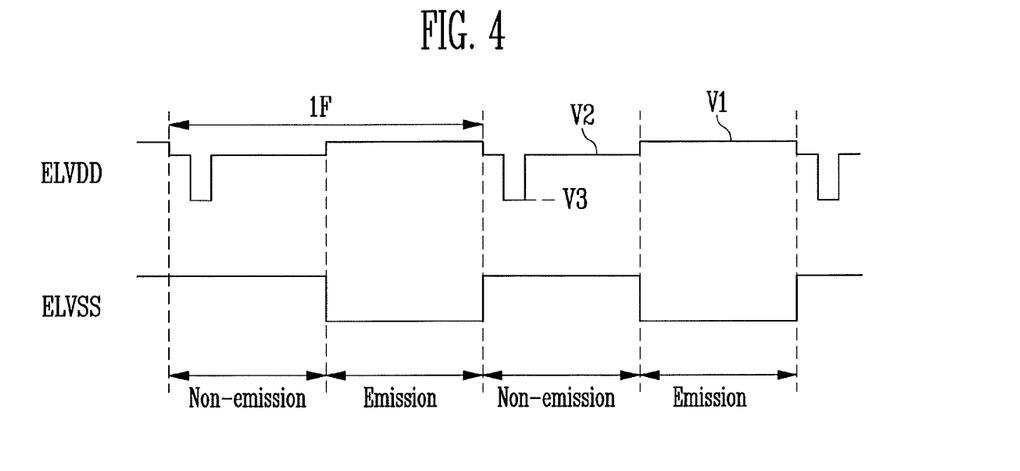
FIG. 4 is a waveform diagram illustrating an embodiment of first second voltages, supplied during a frame period.

FIG. 4 is a waveform diagram illustrating an embodiment of the first second voltages, supplied during a frame period.

Referring to FIG. 4, the second voltage ELVSS is set to a high-level second voltage ELVSS during a non-emission period, and is set to a low-level second voltage ELVSS during an emission period. Here, the value of the high-level second voltage ELVSS is set so that the pixels 140 are set to be in a non-emission state, and the value of the low-level second voltage ELVSS is set so that the pixels 140 are set to be in an emission state.

The first voltage ELVDD is set to a third voltage V3 during a portion of the non-emission period, e.g., the reset period in the frame period. In this case, the third voltage V3 is used as a voltage for initializing the gate electrode of the driving transistor.

The first voltage ELVDD is set to a second voltage V2 during the other periods of the non-emission period, e.g., the threshold voltage compensation period and the scan period. In this case, the second voltage V2 is used to charge the threshold voltage of the driving transistor and the voltage corresponding to the data signal in each capacitor. To this end, the second voltage V2 is set to a voltage higher than the third voltage V3.

The first voltage ELVDD is set to a first voltage V1 during the emission period. In this case, the first voltage V1 is used to supply current to the pixels 140. To this end, the first voltage V1 is set to a voltage higher than the second voltage V2.

Meanwhile, in the example embodiments, the first voltage ELVDD is not immediately dropped from the first voltage V1 to the third voltage V3 during the reset period. In other words, the first voltage ELVDD is dropped from the first voltage V1 to the second voltage V2 and then dropped to the third voltage V3. If the first voltage ELVDD is dropped in the form of a step wave as described above, the ripple noise of the first voltage ELVDD can be minimized.

Figure 5:
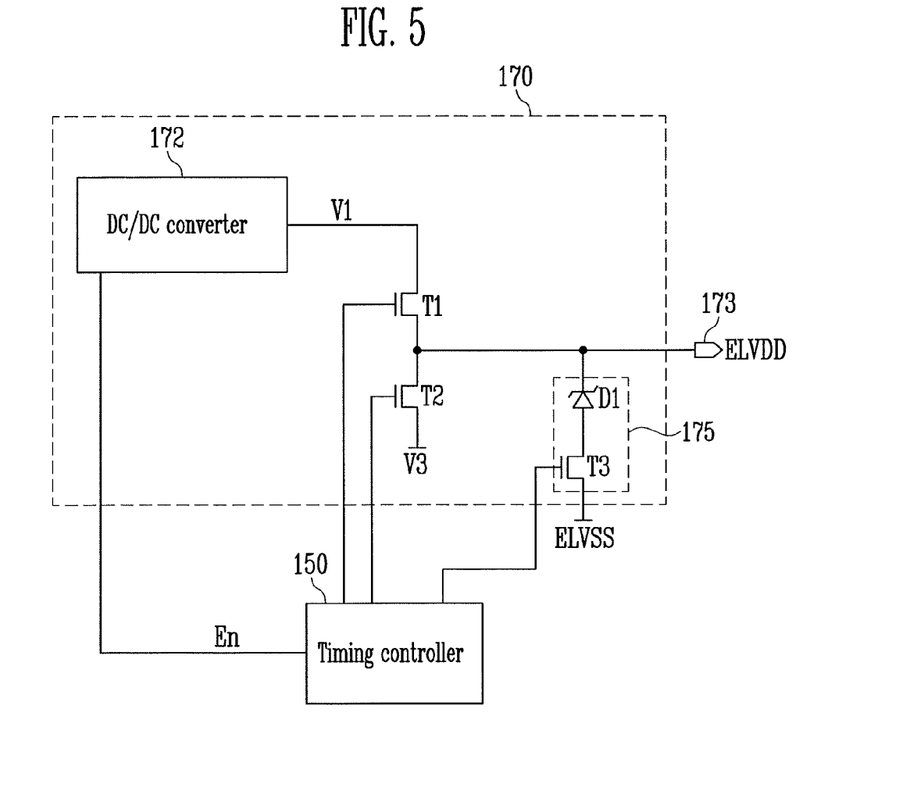
FIG. 5 is a circuit diagram showing a first voltage generator according to an embodiment.

FIG. 5 is a circuit diagram showing a first voltage generator according to an embodiment. Referring to FIG. 5, the first voltage generator 170 according to this embodiment includes a DC/DC converter 172, a first transistor T1, a second transistor T2, and a voltage controller 175.

The DC/DC converter 172 outputs the first voltage V1 while being driven during a period in which an enable signal En is supplied from the timing controller 150, i.e., during the emission period. The DC/DC converter 172 does not output the first voltage V1 during a period in which the enable signal En is not supplied from the timing controller 150, i.e., during the non-emission period.

The first transistor T1 is coupled between the DC/DC converter 172 and an output terminal 173. The first transistor T1 supplies the first voltage V1 to the output terminal 173 during the emission period, corresponding to the control of the timing controller 150.

The second transistor T2 is coupled between the output terminal 173 and a third voltage source V3. The second transistor T2 supplies the third voltage V3 to the output terminal 173 during a portion of the non-emission period, corresponding to the control of the timing controller 150.

The voltage controller 175 is coupled between the output terminal 173 and a predetermined voltage supply, e.g., the second voltage ELVSS. The voltage controller 175 supplies the second voltage V2 to the output terminal 173 during the other periods except the portion of the non-emission period, corresponding to the control of the timing controller 150. The voltage controller 175 controls the voltage of the output terminal 173 so that the voltage of the output terminal 173 is not increased to an undesired voltage.

To this end, the voltage controller 175 includes a zener diode D1 and a third transistor T3, which are coupled in series between the output terminal 173 and the second voltage ELVSS. A cathode electrode of the zener diode D1 is coupled to the output terminal 173, and an anode electrode of the zener diode D1 is coupled to the second voltage ELVSS. The third transistor T3 is coupled between the zener diode D1 and the second voltage ELVSS. The third transistor T3 is turned on during the other periods and an initial period of the emission period, corresponding to the control of the timing controller 150.

Figure 6:
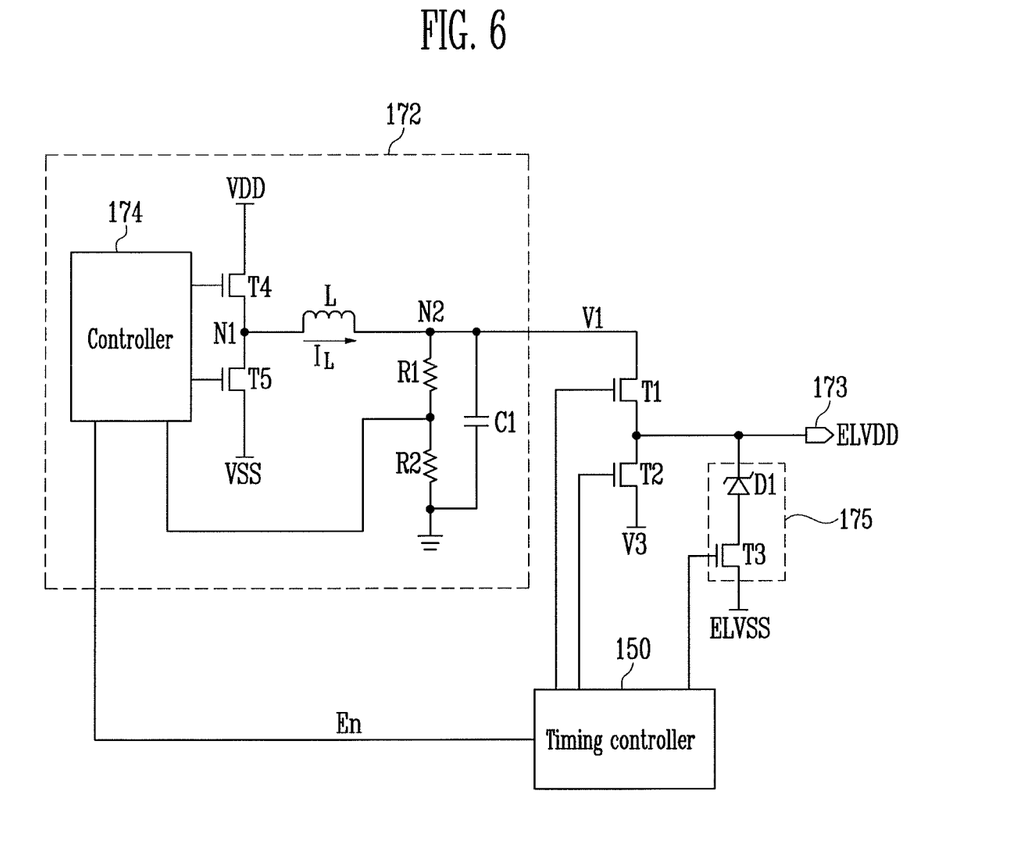
FIG. 6 is a circuit diagram showing an embodiment of a DC/DC converter shown in FIG. 5.

FIG. 6 is a circuit diagram showing an embodiment of the DC/DC converter 172. Referring to FIG. 6, the DC/DC converter 172 according to this embodiment includes a controller 174, fourth and fifth transistors T4 and T5, coupled between a first power voltage VDD and a second power voltage VSS, an inductor L coupled between first and second nodes N1 and N2, first and second resistors R1 and R2 coupled in series between the second node N2 and a ground voltage, and a first capacitor C1 coupled between the second node N2 and the ground voltage. Here, the first node N1 is a common node of the fourth and fifth transistors T4 and T5, and the second node N2 is a node coupled to the first transistor T1.

The fourth and fifth transistors T4 and T5 are coupled in series between the first and second power voltages VDD and VSS. The fourth and fifth transistors T4 and T5 are turned on or turned off, corresponding to the control of the controller 174.

Figure 7:
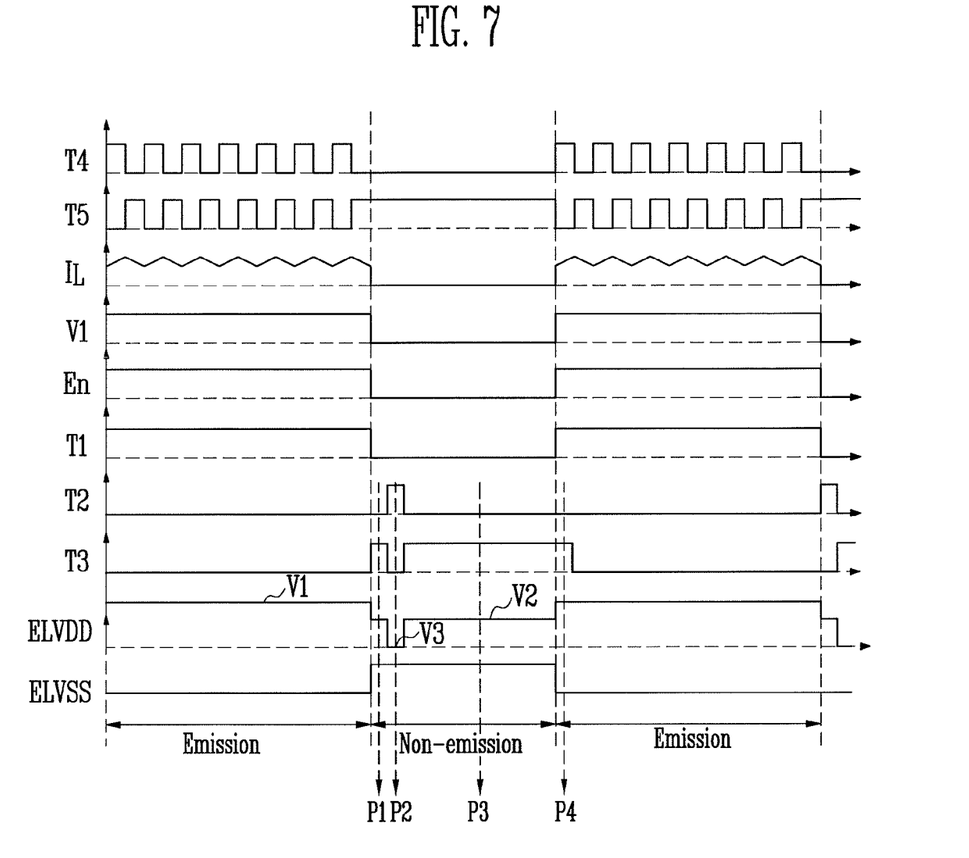
FIG. 7 is a waveform diagram illustrating an embodiment of a driving method of the first voltage generator shown in FIG. 6.

The controller 174 controls the fourth and fifth transistors T4 and T5 so that a predetermined voltage, i.e., the first voltage V1, is applied to the second node N2, while alternately turning on or off the fourth and fifth transistors T4 and T5 during the emission period in which the enable signal En is supplied as shown in FIG. 7. To this end, the voltage applied to the common node between the first and second resistors R1 and R2 is fed back to the controller 174 during the emission period. The controller 174 sets the fourth and fifth transistors T4 and T5 to be respectively in turn-on and turn-off states during the non-emission period in which the enable signal En is not supplied.

That is, in this embodiment, the DC/DC converter 172 outputs the first voltage V1 while alternately turning on and off the fourth and fifth transistors T4 and T5 during the emission period. The DC/DC converter 172 maintains the fifth and fourth transistors T5 and T4 to be respectively in turn-on and turn-off states during the non-emission period. In this case, the first voltage V1 is not output during the non-emission period.

If the DC/DC converter 172 is set to be in a non-driving state during the non-emission period, the power consumption of the DC/DC converter 172 is decreased, and simultaneously, the electrical energy of the DC/DC converter 172 is minimized. For example, if the emission and non-emission periods are set to 40% and 60%, respectively, the power consumption and electrical energy of the DC/DC converter is decreased to about 20% to about 30%.

Meanwhile, as shown in FIG. 7, the second transistor T2 is turned on during a portion of the non-emission period so that the third voltage V3 is output to the output terminal 173, and the third transistor T3 is turned on during the other periods except the portion of the non-emission period so that the second voltage V2 is output to the output terminal 173.

In this embodiment, the second voltage V2 is supplied to the output terminal 173 during the other periods except the portion of the non-emission period so that the DC/DC converter 172 is set to be in a non-driving state during the non-emission period. Here, the second voltage V2 may be set to a voltage between the first and third voltages V1 and V3. For example, in this embodiment, the second voltage V2 is supplied using the value of the high-level second voltage ELVSS.

FIG. 7 is a waveform diagram illustrating an embodiment of a driving method of the first voltage generator 170. Referring to FIG. 7, the fourth and fifth transistors T4 and T5 are alternately turned on and off by the controller 174 during the emission period. If the fourth transistor T4 is turned on, the current flowing in the inductor L is increased by the first power voltage VDD. If the fifth transistor T5 is turned on, the current flowing in the inductor L is decreased by the second power voltage VSS lower than the first power voltage VDD. Here, the voltage applied to the common node of the first and second resistors R1 and R2 is fed back to the controller 174, and the controller 174 controls the turn-on and turn-off of the fourth and fifth transistors T4 and T5 so that the first voltage V1 is applied to the second node N2, corresponding to the fed-back voltage.

Meanwhile, the first transistor T1 is set to be in a turn-on state during the emission period, and accordingly, the first voltage V1 applied to the second node N2 is supplied to the output terminal 173. Thus, the first power ELVDD set to the first voltage V1 is supplied to the pixels 140 during the emission period.

The controller 174 maintains the fifth and fourth transistors to be respectively in turn-on and turn-off states during the non-emission period. The first transistor T1 is set to be in a turn-off state during the non-emission period.

The third transistor T3 is turned on during a first period P1 that is an initial period of the non-emission period. If the third transistor T3 is turned on, the second voltage V2 is supplied to the output terminal 173 by the high-level second voltage ELVSS.

During a second period P2, the third transistor T3 is turned off, and the second transistor T2 is turned on. If the second transistor T2 is turned on, the third voltage V3 is supplied to the output terminal 173. In this case, the pixels 140 are initialized by the first voltage ELVDD of the third voltage V3.

Meanwhile, in the example embodiments, the voltage of the output terminal 173 is dropped from the first voltage V1 to the second voltage V2 during a first period P1, and is dropped from the second voltage V2 to the third voltage V3 during a second period P2. If the voltage of the output terminal 173 is dropped in the form of a step wave, it is possible to minimize a voltage drop and peak current, caused by a rapid change in the voltage of the output terminal 173.

The third transistor T3 maintains a turn-on state during a third period P3. If the third transistor T3 maintains the turn-on state, the second voltage V2 is supplied to the output terminal 173 by the high-level second voltage ELVSS.

Subsequently, the first voltage V1 is applied to the second node N2 by the DC/DC converter 172 during the emission period, and accordingly, the first voltage V1 is supplied to the output terminal 173. The second voltage ELVSS is set to a low-level voltage during the emission period.

Meanwhile, the third transistor T3 maintains a turn-on state during a fourth period P4 that is a latter period of the emission period. Thus, during the fourth period P4, the first voltage V1 is applied to the cathode electrode of the zener diode D1, and the second voltage ELVSS is applied to the anode electrode of the zener diode D1. In this case, the increase in the voltage of the output terminal 173, caused by the ripple noise, is limited by breakdown characteristics of the zener diode D1. In a case where the increase in the voltage of the output terminal 173 is limited as described above, circuit elements such as transistors can be designed to be driven within a stable voltage.

Figure 8:
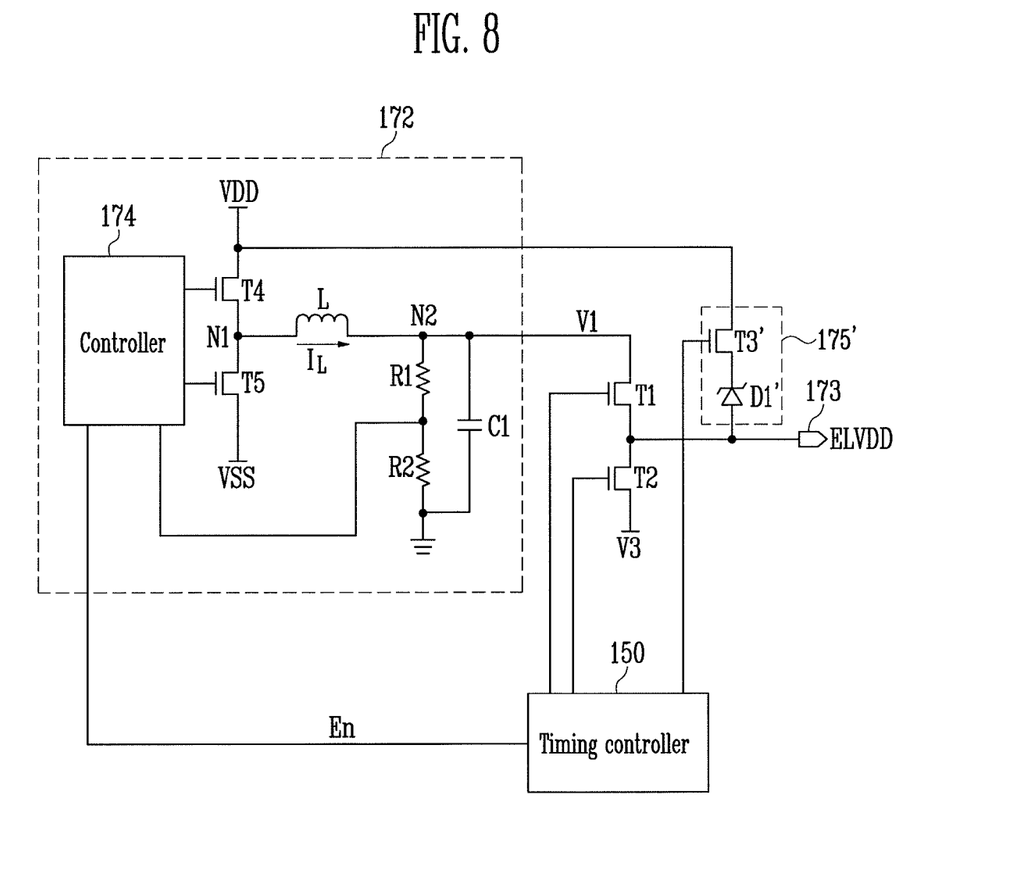
FIG. 8 is a circuit diagram showing a first voltage generator according to another embodiment.

FIG. 8 is a circuit diagram showing a first voltage generator according to another embodiment. In description of FIG. 8, descriptions of components identical to those of FIG. 6 will be omitted.

Referring to FIG. 8, a voltage controller 175' is coupled between the output terminal 173 and the first power voltage VDD. The voltage controller 175' supplies a predetermined voltage, e.g., the second voltage V2, to the output terminal 173 during the other periods except the portion of the non-emission period, corresponding to the control of the timing controller 150.

To this end, the voltage controller 175' includes a third transistor T3' and a zener diode D1', coupled in series between the first power voltage VDD and the output terminal 173. An anode electrode of the zener diode D1' is coupled to the output terminal 173, and a cathode electrode of the zener diode D1' is coupled to the first power voltage VDD. The third transistor T3' is coupled between the cathode electrode of the zener diode D1' and the first power voltage VDD. The third transistor T3 is turned on during a period in which the second transistor T2 is turned on and the other periods in the non-emission period, corresponding to the control of the timing controller 150.

Figure 9:
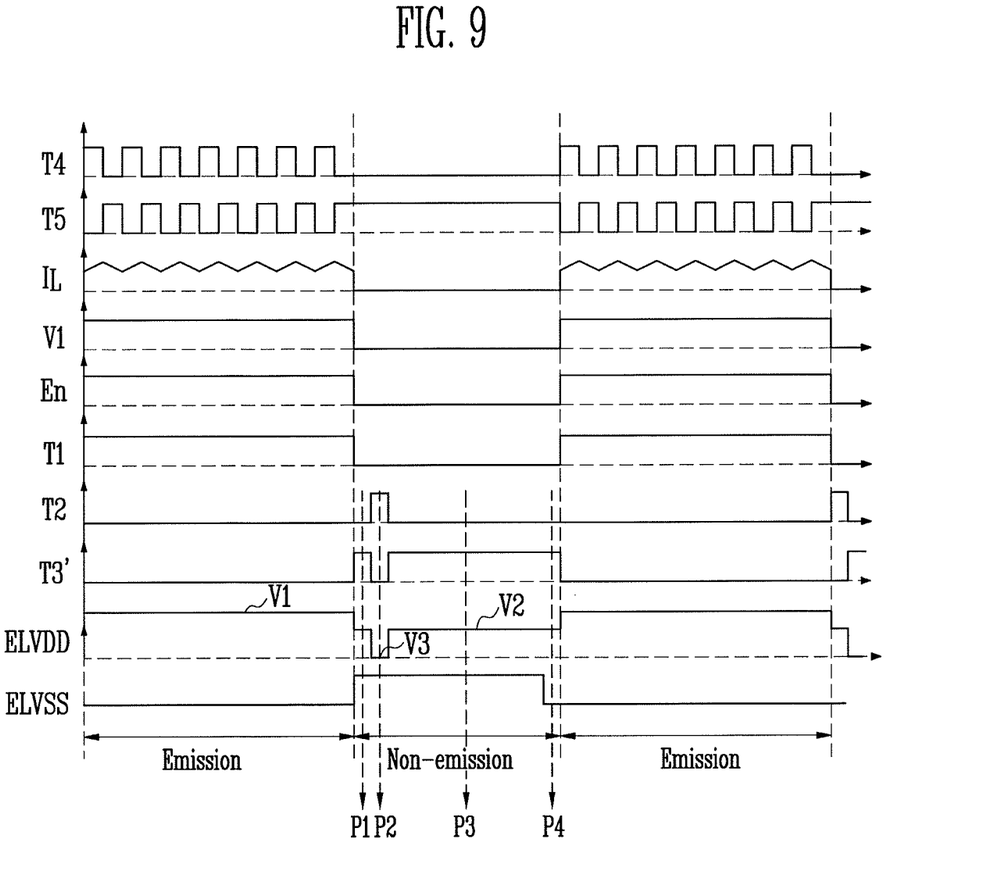
FIG. 9 is a waveform diagram illustrating an embodiment of a driving method of the first voltage generator shown in FIG. 8.

FIG. 9 is a waveform diagram illustrating an embodiment of a driving method of the first voltage generator shown in FIG. 8. Referring to FIG. 9, the third transistor T3' is turned on during the first period P1 that is an initial period of the non-emission period. In this case, the first and second transistors T1 and T2 are set to be in a turn-off state.

If the third transistor T3 is turned on, the first power voltage VDD is applied to the cathode electrode of the zener diode D1'. In this case, a breakdown voltage, e.g., the second voltage V2, is applied to the zener diode D1'. To this end, the zener diode D1' is formed so that the breakdown voltage becomes the second voltage V2. The second voltage V2 applied to the zener diode D1' is supplied to the output terminal 173.

During the second period, the third transistor T3' is turned off, and the second transistor T2 is turned on. If the second transistor T2 is turned on, the third voltage V3 is supplied to the output terminal 173. In this case, the pixels 140 are initialized by the first voltage ELVDD of the third voltage V3.

Meanwhile, in the example embodiments, the voltage of the output terminal 173 is dropped from the first voltage V1 to the second voltage V2 during the first period P1, and is dropped from the second voltage V2 to the third voltage V3 during the second period P2. If the voltage of the output terminal 173 is dropped in the form of a step wave, it is possible to minimize a voltage drop and peak current caused by a rapid change in the voltage of the output terminal 173.

The third transistor T3' maintains a turn-on state during the third period P3. If the third transistor T3' maintains the turn-on state, the second voltage V2 is supplied to the output terminal 173 by the zener diode D1'.

Subsequently, the value of the second voltage ELVSS is dropped to a low level during the fourth period P4 that is a latter period of the non-emission period. In this case, the output terminal 173 stably maintains the second voltage V2, regardless of a change in the value of the second voltage ELVSS, i.e., a coupling problem caused by a parasitic capacitor or the like.

Subsequently, during the emission period, the third transistor T3' is turned off, and the first transistor T1 is turned on. Then, the first voltage V1 is applied to the second node by the DC/DC converter 172, and accordingly, the first voltage V1 is supplied to the output terminal 173.

As described above, according to the example embodiments, since the value of the first voltage is dropped in the form of a step wave, peak current can be minimized, and accordingly, the stability of the first voltage can be ensured. Further, ripple noise can be minimized by limiting an increase of the value of the first voltage, and accordingly, the stability of the first voltage can be ensured. Furthermore, the DC/DC converter is not driven during the non-emission period, and accordingly, power consumption can be minimized.

In contrast, in a conventional organic light emitting display device, the voltage of driving power (first power ELVDD and second power ELVSS) may be changed during one frame period so as to overcome the non-uniform intensity between pixels and to simplify the structure of the pixels. In particular, in a case where the voltage of the driving power is changed, it may be possible to compensate for the threshold voltage of a driving transistor while minimizing the number of transistors included in the pixel. However, if the voltage of the driving power is changed, power consumption may increase and stability may decrease. Therefore, display quality may be deteriorated.

Specifically, at the time when the voltage of the driving power is changed, the voltage of the driving power is increased or decreased to an undesired voltage by ripple noise including a kickback voltage caused by the parasitic capacitance of transistors, power lines, and the like. In this case, electromagnetic interference (EMI) is increased, stress of the transistors is increased, and an undesired voltage is charged in the pixel. Further, since the driving power is changed once or more during one frame period, there display quality is lowered and power consumption is increased due to the heat generation of a power supplier.

While example embodiments have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A voltage generator, comprising:
a DC/DC converter to output a first voltage during a first period of a frame period, the DC/DC converter being connected to a first power voltage source and to a second power voltage source lower than the first power voltage source;
a first transistor coupled between the DC/DC converter and an output terminal, the first transistor to be turned on during the first period;
a second transistor coupled between the output terminal and a third voltage source, the third voltage source to supply a third voltage lower than the first voltage, and the second transistor to be turned on during a third period of the frame period; and
a voltage controller coupled to the output terminal, the voltage controller to limit a voltage of the output terminal, wherein
the DC/DC converter has a normal state to generate the first voltage by a switching operation of the DC/DC converter during the first period using the first and second power voltage sources, and has a non-driving state to reduce power consumption by limiting the switching operation of the DC/DC converter during remaining period of the frame except the first period, and wherein
the DC/DC converter includes fourth and fifth transistors coupled in series between the first and second power voltage sources, the fourth and fifth transistors alternately turned on and turned off during the first period, and respectively turned off and turned on during the remaining period of the frame except the first period.

2. The voltage generator according to claim 1, wherein the voltage controller is to supply a second voltage lower than the first voltage to the output terminal during a second period and during a fourth period, the second period being between the first and third periods of the frame period, and the fourth period being posterior to the third period of the frame period.

3. The voltage generator according to claim 2, wherein the second voltage is higher than the third voltage.

4. The voltage generator according to claim 2, wherein the voltage controller is coupled between the output terminal and a second voltage source, the second voltage source to supply a low-level voltage during the first period and to supply a high-level voltage during the second to fourth periods.

5. The voltage generator according to claim 4, wherein the voltage controller includes a zener diode and a third transistor, the zener diode and third transistor being coupled in series between the output terminal and the second voltage source.

6. The voltage generator according to claim 5, wherein the third transistor is to be turned on during the second period, during the fourth period, and during an initial period that is a portion of the first period.

7. The voltage generator according to claim 2, wherein the voltage controller is coupled between the first power voltage source and the output terminal.

8. The voltage generator according to claim 7, wherein the voltage controller includes a zener diode and a third transistor, the zener diode and third transistor being coupled in series between the first power voltage source and the output terminal.

9. The voltage generator according to claim 8, wherein the third transistor is to be turned on during the second and fourth periods.

10. The voltage generator according to claim 1, wherein the DC/DC converter includes:
   an inductor coupled between the first transistor and a first node, the first node being a common node between the fourth and fifth transistors; and
   a controller to control turn-on and turn-off of the fourth and fifth transistors.

11. An organic light emitting display device, comprising:
   pixels coupled between scan lines and data lines;
   a first voltage generator including a DC/DC converter, the first voltage generator to supply a first voltage to the pixels during a first period of a frame and to supply a voltage lower than the first voltage to the pixels during a subsequent period of the frame, the first period being an emission period of the frame and the subsequent period being a non-emission period of the frame; and
   a second voltage generator to supply a low-level second voltage to the pixels during the first period and to supply a high-level second voltage to the pixels during a portion of the subsequent period,
   wherein the first voltage generator is to drop a voltage in a form of a step wave during the subsequent period, wherein
   the first voltage generator has a normal state to generate the first voltage through a switching operation of the first voltage generator during the first period using first and second power voltage sources, and has a non-driving state to reduce power consumption by limiting the switching operation of the first voltage generator during remaining period of the frame except the first period, and wherein
   the DC/DC converter includes fourth and fifth transistors coupled in series between the first and second power voltage sources, the fourth and fifth transistors alternately turned on and turned off during the first period, and respectively turned off and turned on during the remaining period of the frame except the first period.

12. The organic light emitting display device according to claim 11, wherein: the DC/DC converter outputs the first voltage during the first period, and the second power voltage source is lower than the first power voltage source.

13. The organic light emitting display device according to claim 12, wherein the first voltage generator includes:
   a first transistor coupled between the DC/DC converter and an output terminal, the first transistor to be turned on during the first period;
   a second transistor coupled between the output terminal and a third voltage source, the third voltage source to supply a third voltage lower than the first voltage, and the second transistor to be turned on during a third period that is a portion of the subsequent period; and
   a voltage controller coupled to the output terminal, the voltage controller to supply a second voltage lower than the first voltage to the output terminal during a second period between the first and third periods and during a fourth period posterior to the third period, which are contained in the subsequent period.

14. The organic light emitting display device according to claim 13, wherein the second voltage is higher than the third voltage.

15. The organic light emitting display device according to claim 13, wherein the voltage controller is coupled between the output terminal and a second voltage source, the second voltage source to supply a low-level voltage during the first period and to supply a high-level voltage during the second to fourth periods.

16. The organic light emitting display device according to claim 15, wherein the voltage controller has a zener diode and a third transistor, the zener diode and third transistor being coupled in series between the output terminal and the second voltage source.

17. The organic light emitting display device according to claim 16, wherein the third transistor is turned on during the second period, during the fourth period, and during an initial period that is a portion of the first period.

18. The organic light emitting display device according to claim 13, wherein the voltage controller is coupled between the first power voltage source and the output terminal.

19. The organic light emitting display device according to claim 18, wherein the voltage controller has a zener diode and a third transistor, the zener diode and third transistor being coupled in series between the first power voltage source and the output terminal.

20. The organic light emitting display device according to claim 19, wherein the third transistor is to be turned on during the second and fourth periods.

21. The organic light emitting display device according to claim 18, wherein the second voltage generator is to output a low-level second voltage during a latter period of the fourth period.

* * * * *